United States Patent
Gotoh et al.

(10) Patent No.: US 8,859,034 B2
(45) Date of Patent: Oct. 14, 2014

(54) INGOT MOLD FOR SILICON INGOT AND METHOD FOR MAKING THE SAME

(75) Inventors: Shigeru Gotoh, Higashiomi (JP); Youhei Sakai, Higashiomi (JP); Kentaro Okushima, Higashiomi (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 12/694,566

(22) Filed: Jan. 27, 2010

(65) Prior Publication Data

US 2010/0237225 A1 Sep. 23, 2010

(30) Foreign Application Priority Data

Jan. 28, 2009 (JP) .................................. 2009-17082
Apr. 7, 2009 (JP) .................................. 2009-93120
Jan. 27, 2010 (JP) .................................. 2010-15752

(51) Int. Cl.
*B28B 7/38* (2006.01)
*B29C 33/60* (2006.01)
*B01J 2/10* (2006.01)
*B28B 7/34* (2006.01)
*B05D 3/00* (2006.01)
*B05D 3/02* (2006.01)

(52) U.S. Cl.
CPC . *B01J 2/10* (2013.01); *B29C 33/60* (2013.01); *B28B 7/346* (2013.01); *B05D 3/002* (2013.01); *B05D 3/0218* (2013.01)
USPC .......................................... 427/133; 249/115

(58) Field of Classification Search
USPC ......... 427/133, 134, 135, 212, 213.3, 213.31, 427/215, 220, 221, 214
See application file for complete search history.

(56) References Cited

U.S. PATENT DOCUMENTS 6,491,971 B2 * 12/2002 Costantini et al. ............ 427/133
6,866,803 B1 * 3/2005 Matsumoto et al. ........... 264/42
2002/0014574 A1 * 2/2002 Wakita et al. ................. 249/204

(Continued)

FOREIGN PATENT DOCUMENTS

| JP | 63-248541 | 10/1988 |
| JP | 2002239682 | 8/2002 |
| JP | 2007-191345 A | 8/2007 |
| WO | 2008/026688 A1 | 3/2008 |

OTHER PUBLICATIONS

Laurent "Structure of powder flow in a planetary mixer during wet-mass granulation". Chemical Engineering Science vol. 60 (2005) pp. 3805-3816.*

(Continued)

*Primary Examiner* — Dah-Wei D Yuan
*Assistant Examiner* — Jose Hernandez-Diaz
(74) *Attorney, Agent, or Firm* — Procopio, Cory, Hargreaves & Savitch LLP

(57) ABSTRACT

A method for forming a mold comprises forming a body by kneading a ceramic powder comprising a silicon nitride powder and a first binder solution; forming a slurry by adding a second binder solution to the body; and forming a release layer by attaching the slurry to a surface of a mold base. A method for manufacturing a solar cell element comprises forming a silicon ingot by solidifying a silicon melt in the mold obtained by the above-described method for forming a mold; slicing the silicon ingot into substrates each having a predetermined thickness; forming a diffusion layer on each of the substrates; and forming an electrode on a surface of the diffusion layer.

10 Claims, 9 Drawing Sheets

(56) References Cited

U.S. PATENT DOCUMENTS

| | | | |
|---|---|---|---|
| 2007/0007700 A1* | 1/2007 | Satou et al. | 264/650 |
| 2007/0089642 A1* | 4/2007 | Engler et al. | 106/401 |
| 2008/0230678 A1* | 9/2008 | Sakai et al. | 249/160 |
| 2009/0119882 A1* | 5/2009 | Uibel | 23/295 R |
| 2009/0159230 A1 | 6/2009 | Tsuchida et al. | |

OTHER PUBLICATIONS

Office Action dated Dec. 17, 2013, issued in counterpart Japanese Application No. 2010-015752.

Office Action dated Feb. 25, 2014 in counterpart Japanese application No. 2010-033288.

* cited by examiner

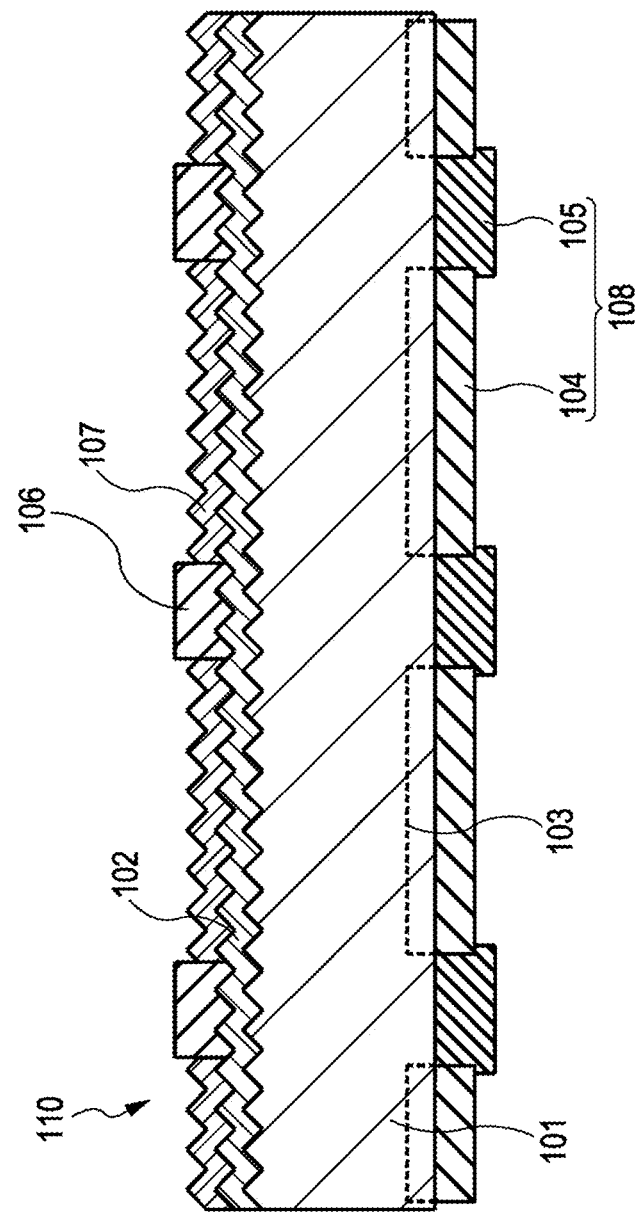

8,859,034 B2

INGOT MOLD FOR SILICON INGOT AND METHOD FOR MAKING THE SAME

CROSS-REFERENCE TO RELATED APPLICATION

The present application claims priority under 35 U.S.C. §119 to Japanese Patent Application No. 2009-017082, filed on Jan. 28, 2009, entitled "METHOD FOR MAKING MOLD, MAKING SUBSTRATE FOR SOLAR CELL ELEMENT, MAKING SOLAR CELL ELEMENT and MAKING SILICON INGOT", Japanese Patent Application No. 2009-093120, filed on Apr. 7, 2009, entitled "METHOD FOR MAKING MOLD, MAKING SUBSTRATE FOR SOLAR CELL ELEMENT, MAKING SOLAR CELL ELEMENT and MAKING SILICON INGOT", and Japanese Patent Application No. 2010-15752, filed on Jan. 27, 2010, entitled "METHOD FOR MAKING MOLD, MAKING SUBSTRATE FOR SOLAR CELL ELEMENT, MAKING SOLAR CELL ELEMENT and MAKING SILICON INGOT" The contents of each of the above identified applications are incorporated by reference herein in their entirety.

FIELD OF THE INVENTION

The present invention relates to a mold used for manufacturing an ingot, and particularly to a mold used for manufacturing a silicon ingot for providing a substrate for a solar cell element.

BACKGROUND

Polycrystalline silicon substrates have been used as one type of a semiconductor substrate for forming solar cell elements. Polycrystalline silicon substrates are obtained by slicing a silicon ingot at a predetermined thickness. When such a silicon ingot is formed, a mold having a release layer formed on the inner surface thereof may be used. The release layer is formed as follows. First, a silicon nitride powder is mixed with an aqueous polyvinyl alcohol solution under stirring to prepare a slurry. The inner surface of a mold base is then coated with the slurry to form a release layer.

During the preparation of the slurry, particles of the silicon nitride powder may easily adhere to one another to form coarse particles (e.g., average diameter: about 100 μm). If a release layer is formed using a slurry having such coarse particles, the release layer may be easily detached from the mold because the bonding strength between the coarse particles is weak. This may require an additional step of pulverizing the coarse particles into small particles.

Thus, the number of steps performed in the formation of a mold used for manufacturing an ingot needs to be decreased.

SUMMARY

According to an embodiment of the present invention, a method for forming a mold comprises forming a body by kneading a ceramic powder comprising a silicon nitride powder and a first binder solution; forming a slurry by adding a second binder solution to the body; and forming a release layer by attaching the slurry to a surface of a mold base.

According to an embodiment of the present invention, a method for manufacturing a substrate for a solar cell element comprises forming a body by kneading a ceramic powder comprising a silicon nitride powder and a first binder solution; forming a slurry by adding a second binder solution to the body; preparing a mold base; forming a mold by forming a release layer through attachment of the slurry to an inner surface of the mold base; forming a silicon ingot by solidifying a silicon melt in the mold; and slicing the silicon ingot at a predetermined thickness.

According to an embodiment of the present invention, a method for manufacturing a solar cell element comprises forming a body by kneading a ceramic powder comprising a silicon nitride powder and a first binder solution; forming a slurry by adding a second binder solution to the body; preparing a mold base; forming a mold by forming a release layer through attachment of the slurry to a surface of the mold base; forming a silicon ingot by solidifying a silicon melt in the mold; slicing the silicon ingot into substrates each having a predetermined thickness; forming a diffusion layer on each of the substrates; and forming an electrode on a surface of the diffusion layer.

BRIEF DESCRIPTION OF THE DRAWINGS

FIG. 9 is a sectional view schematically showing a solar cell element according to an embodiment of the present invention.

DETAILED DESCRIPTION

Figure 1:
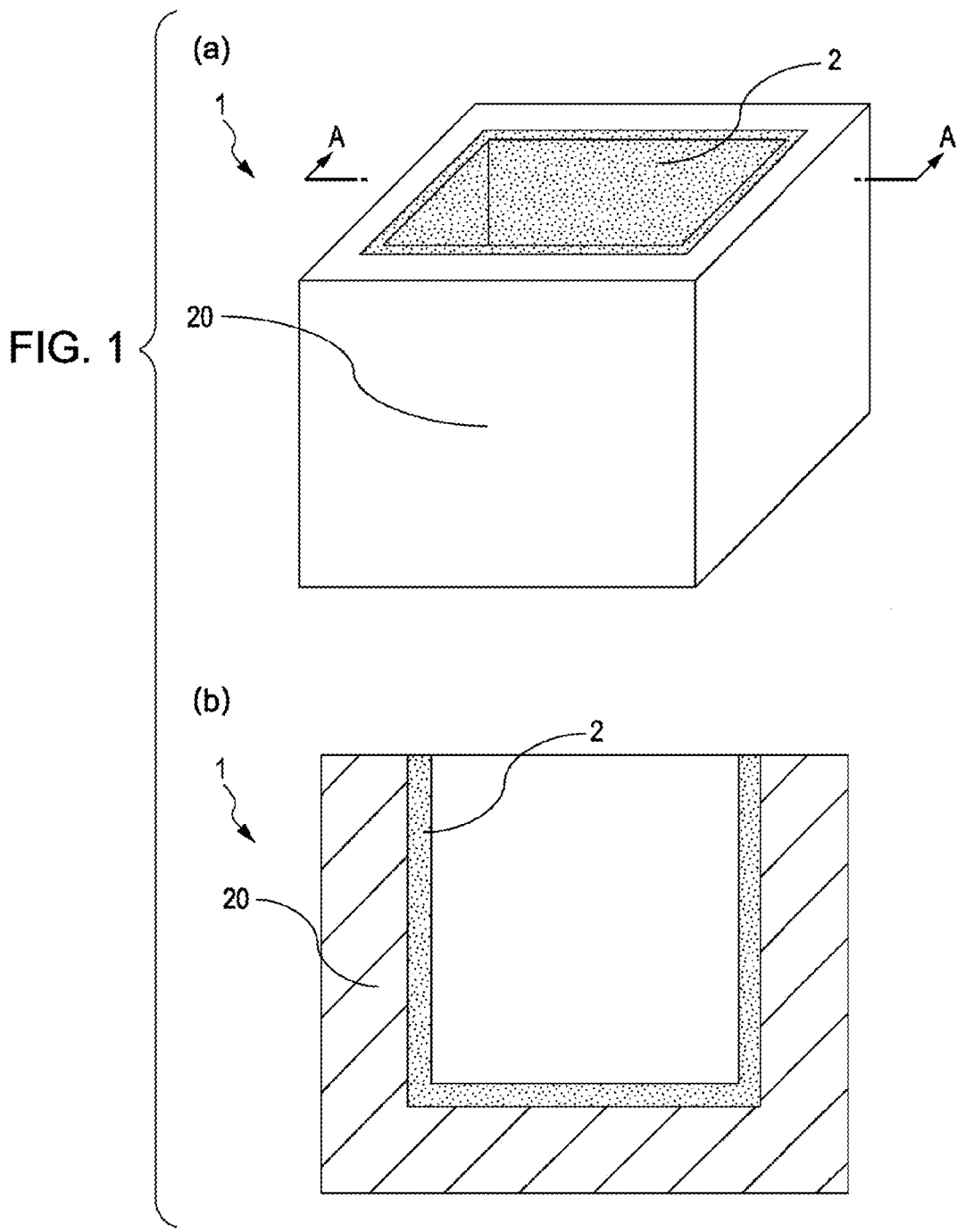
FIG. 1A is a perspective view schematically showing a mold according to an embodiment of the present invention.
FIG. 1B is a sectional view taken along line A-A of FIG. 1A.

FIG. 1A is a perspective view of a mold 1 according to an embodiment of the present invention. FIG. 1B is a sectional view taken along line A-A of FIG. 1A. As shown in FIGS. 1A and 1B, the top of the mold 1 is open. The mold 1 has an inner space for storing a silicon melt. The inner space is a rectangular parallelepiped that is square in top view.

A silicon ingot can be manufactured by feeding a silicon melt into the mold 1, the silicon melt being obtained by heating and melting silicon at a high temperature, and by subjecting the silicon melt to unidirectional solidification in the mold 1. Alternatively, a silicon ingot may be manufactured by melting a silicon material itself in the mold 1 and subsequently solidifying the resultant silicon melt in the mold 1. The resultant silicon ingot is sliced at a predetermined thickness to provide a large number of silicon substrates. The thus-obtained silicon substrates can be used as substrates for solar cell elements by the method described below.

The mold 1 includes a mold base 20 and a release layer 2 formed on the surface of the mold base 20.

The mold base 20 can be composed of a carbon material such as graphite or a carbon fiber reinforced material, quartz, silica, or a ceramic. The mold base 20 may be integrally formed or may be formed by assembling members serving as the bottom portions and the side portions.

The release layer 2 is a layer formed for the purpose of achieving releasability from the mold base 20 and is mainly composed of silicon nitride. The release layer 2 is formed using a slurry (release agent slurry) containing silicon nitride powder and prepared by the method described below. Specifically, the release layer 2 is formed by applying the slurry with a spatula, a brush, or the like, or by spraying the slurry so that the slurry adheres to the inner surface of the mold base 20; and then by allowing the applied slurry to air-dry or drying the applied slurry using a hot plate.

Hereinafter, a method for forming the mold 1 is described.

<Ceramic Powder Preparation Step>

A ceramic powder, which is a material of the release layer 2, is prepared. The ceramic powder contains at least a silicon nitride powder. A silicon nitride powder prepared by, for example, an imide decomposition method and having an average particle size of about 0.1 to 10 μm can be used as the silicon nitride powder. The silicon nitride powder may be crystalline or amorphous. The silicon nitride powder may have a regular shape such as a spherical shape or an irregular shape.

The silicon nitride powder may be subjected to surface oxidation treatment. Specifically, the surface oxidation treatment is performed by charging silicon nitride powder into a vessel and heating the silicon nitride powder with a batch-type electric furnace or a continuous-type tunnel furnace in an oxidizing atmosphere for a certain period of time. Herein, the vessel can be composed of quartz or the like, which is resistant to high temperatures and can reduce the entry of impurities. The heating temperature may be 700° C. to 1300° C.

As a result of the surface oxidation treatment, amorphous silicon dioxide layers, which are oxide films, are formed on the surfaces of the silicon nitride powder particles.

The silicon nitride powder may contain silicon nitride clusters having a size of about several centimeters and formed through adhesion between/among particles. In this case, the silicon nitride clusters are pulverized into powder particles before the surface oxidation treatment, and the resultant powder particles are subjected to the surface oxidation treatment. Thus, oxide films having a uniform thickness can be formed on the silicon nitride powder particles, which reduces the variation in the degree of oxidation for each of the powder particles.

Hereinafter, such a silicon nitride powder having oxide films on the surfaces of the particles thereof may be referred to as a surface-oxidized silicon nitride powder and the particles of such a powder may be referred to as surface-oxidized silicon nitride particles.

The release layer 2 can be formed using the silicon nitride powder that has been subjected to the surface oxidation treatment as described above. Consequently, when the mold 1 is heated to a relatively high temperature (e.g., a temperature close to the melting point of silicon) during the production of a silicon ingot, oxide films on the surfaces of the silicon nitride powder particles constituting the release layer 2 are softened and modified by oxidation to generate silanol groups (Si—OH). Such silanol groups are bonded to each other to form siloxane bonds (Si—O—Si). This increases adhesion between the silicon nitride powder particles, thereby increasing the strength of the release layer 2.

The ceramic powder may further contain a silicon dioxide powder in addition to the silicon nitride powder. This increases adhesion between the silicon nitride powder particles in the same manner as that of the surface-oxidized silicon nitride powder, thereby further increasing the strength of the release layer 2. This reduces the detachment of part of the release layer 2 and the entry of the release layer 2 into a silicon melt during the production of a silicon ingot. For example, a powder having an average particle size of about 20 μm and prepared by pulverizing quartz glass can be used as the silicon dioxide powder.

The silicon nitride powder may be mixed with the silicon dioxide powder in advance (powder mixing step). By uniformly mixing the powders to some degree, the variation in the degree of mixing between the powders and a first binder solution to be used in the subsequent step can be decreased. Herein, the powders may be placed in a mixer and mixed using the mixer. An example of the mixer is a kneading mixer such as a planetary mixer whose blade undergoes planetary motion. Since the kneading mixer can be used in the subsequent step, the productivity can be improved. By operating the mixer at a small speed of revolution, the rising of the powders during mixing can be reduced.

The number of revolutions of the mixer in this step may be, for example, 5 to 20 rpm.

<Pellet Formation Step>

The ceramic powder containing at least the silicon nitride powder and the first binder solution containing a binder and a solvent are kneaded to form a plurality of pellets of the ceramic powder.

Examples of the binder include polyvinyl alcohol (PVA), polyvinyl butyral (PVB), methyl cellulose (MC), carboxymethyl cellulose (CMC), ethyl cellulose (EC), hydroxypropyl cellulose (HPC), and wax. Examples of the solvent include water, methanol, and dimethyl sulfoxide.

The binder solution is added to the silicon nitride powder in an amount at which the mixture does not become slurry and then kneaded. For example, the binder solution is added to the silicon nitride powder in an amount of about 40 to 73% by mass relative to the total amount of the binder solution planned to be added and then kneaded.

The addition of a solution to a powder and the kneading of the resultant mixture cause a so-called agglomerated particle phenomenon in which the solution captures some particles and lumps are thereby formed. Some particles are agglomerated, which comes to forming a plurality of pellets (lumps).

Herein, the kneading mixer may be operated at a rotational speed higher than that in the powder mixing step to perform kneading. That is, the number of revolutions of the kneading mixer in the pellet formation step can be increased compared with that in the powder mixing step. As a result, the ceramic powder is brought into contact with the first binder solution more frequently, whereby the particles agglomerate quickly and the plurality of pellets are efficiently formed, which improves productivity. Furthermore, the addition of the first binder solution can reduce the rising of the ceramic powder.

The number of revolutions of the mixer in this step may be, for example, 30 to 60 rpm.

The load applied to the mixer in this step is larger than that in the powder mixing step. The load applied to the mixer can be determined from a current value applied to a motor.

<Body Formation Step>

By further kneading the plurality of pellets formed, the pellets adhere to one another to form larger pellets. By repeatedly performing this process, the plurality of pellets agglomerated to form a body (a single lump).

In the body formation step, the first binder solution is caused to conform to the ceramic powder by applying pressure through kneading. Consequently, the first binder solution disperses and gradually enters the spaces between the ceramic particles. Thus, the ceramic particles adhere to each other and a body is thereby formed.

In the kneading process described above, the collision of the ceramic particles causes a shearing stress. This can reduce the generation of coarse particles due to adhesion and aggregation of ceramic particles.

The load applied to the mixer in this step temporarily significantly increases compared with that in the pellet formation step because of the frictional force exerted by the collision of the ceramic particles. After the body is formed, the ceramic particles easily move over each other. Thus, once the load applied to the mixer reaches a certain peak value, the load then starts to decrease.

The number of revolutions of the kneading mixer in this step can be decreased in accordance with the increase in the load applied to the mixer. The number of revolutions is lower than that in the pellet formation step. By performing kneading at such a small speed of revolution, the body is formed. Further kneading for a certain period of time decreases the viscosity of the body.

In this kneading for decreasing the viscosity of the body, the number of revolutions may be made constant. However, the number of revolutions may be increased as the load applied to the mixer decreases, which can further reduces the generation of coarse particles in this step.

The number of revolutions of the mixer during the kneading for body formation may be, for example, 25 to 40 rpm. The number of revolutions of the mixer for adjusting the viscosity of the body may be, for example, 40 to 60 rpm.

<Slurry Formation Step>

A second binder solution is added dropwise to the body having a low viscosity under stirring, whereby the body is changed into slurry (slurrying step). Specifically, the second binder solution is stored in a hopper, and the second binder solution in the hopper is then added dropwise to the body in the kneading mixer under stirring. Consequently, the second binder solution conforms to the body, which changes the body into paste and then into slurry.

After it is confirmed that the body is changed into slurry, the viscosity of the slurry is adjusted by further adding the second binder solution and/or the solvent (viscosity adjusting step). By appropriately adjusting the viscosity of the slurry in this step, the slurry can be applied to the mold base 20 at a uniform thickness.

The load applied to the mixer in this step further decreases compared with that in the body formation step. Therefore, the kneading mixer can be operated at a large speed of revolution so long as the slurry does not scatter from the mixer.

The number of revolutions of the mixer in this step may be, for example, 40 to 60 rpm.

The type of the second binder solution, that is, the composition of the second binder solution may be the same as or different from that of the first binder solution. In case the second binder solution has the same composition as the first binder solution, the second binder solution easily conforms to the body.

In this step, the slurry may be screened after the slurrying step or the viscosity adjusting step. This can remove coarse particles left in the slurry. In particular, when the slurry is applied by spraying in the step described below, clogging of a spray apparatus can be reduced. An example of the screen is a screen having a mesh with an opening of 10 to 500 µm.

<Formation of Release Layer>

The thus-obtained slurry is attached to the inner surface of the mold base 20. The slurry is applied to the inner surface using a spatula, a brush, or the like or by spraying. Such a slurry attached to the inner surface is dried by air-drying or by placing the mold base 20 on a hot plate. As a result, a release layer 2 is formed on the mold base 20 to obtain a mold 1. The release layer 2 may have a thickness of about 0.3 to 2 mm.

In this embodiment, as described above, the body composed of the ceramic powder containing at least a silicon nitride powder is formed and then changed into slurry. This reduces the number of coarse particles and allows the ceramic powder and the binder solution to be thoroughly mixed, which can reduce the aggregation of the ceramic powder.

For the silicon nitride powder subjected to surface oxidation treatment, some of the powder particles may adhere to one another using the oxide films thereof as bonding sites. However, the aggregation of the silicon nitride powder can be eliminated in the body formation step. Thus, an additional step of pulverizing the aggregates of the silicon nitride powder isn't be required, and the release layer 2 in which the silicon nitride powder particles are suitably dispersed can be formed.

In other words, the aggregates that have been present in the silicon nitride powder after the surface oxidation treatment are not easily left after the body formation step, and the release layer 2 having the silicon nitride powder particles uniformly dispersed therein can be formed.

As a result, by forming the mold 1 through the steps described above, the entry of impurities during the production of a silicon ingot can be reduced and a mold with high productivity is obtained.

Figure 2:
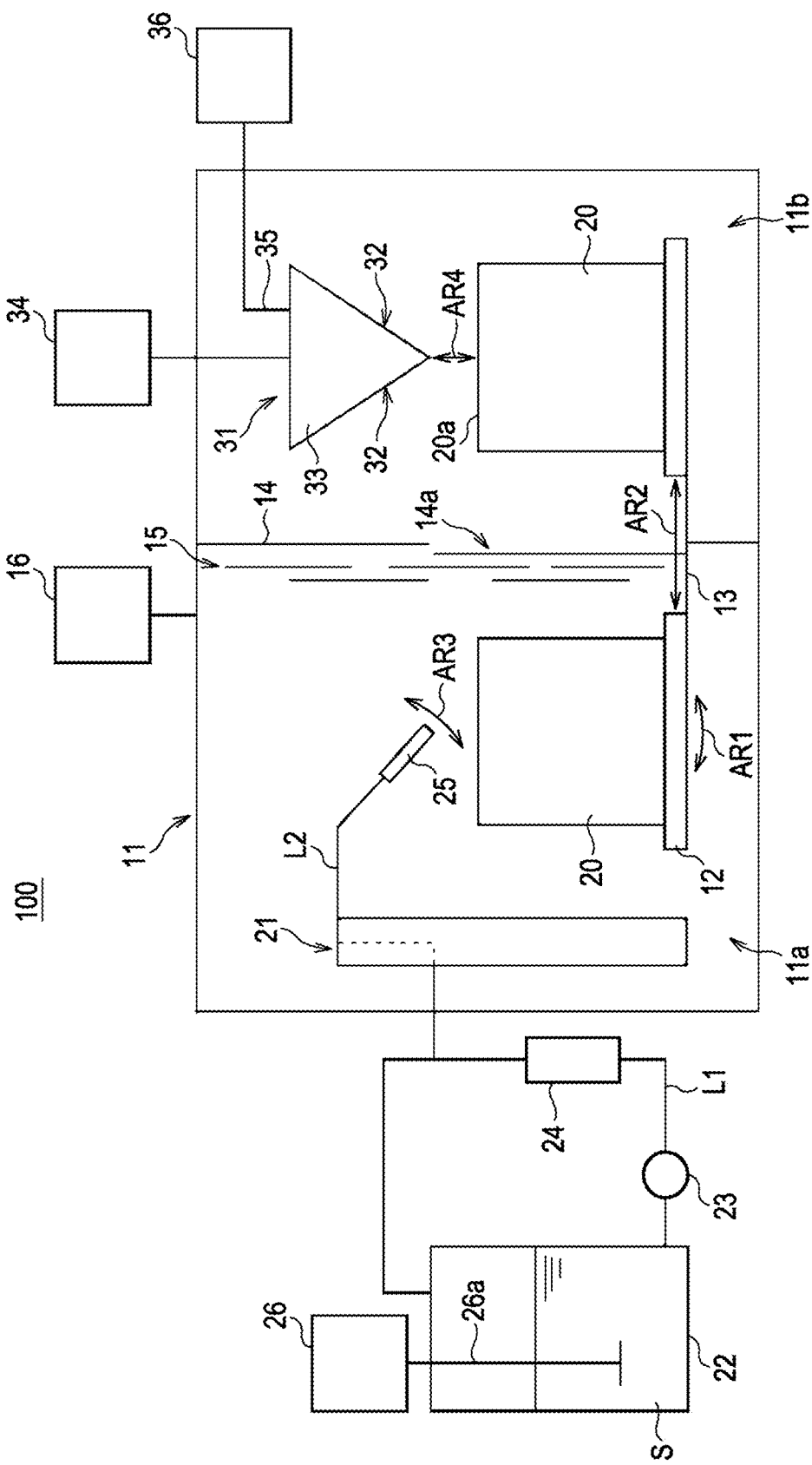
FIG. 2 is a schematic view showing a configuration of a release layer forming apparatus according to an embodiment of the present invention.
Figure 3:
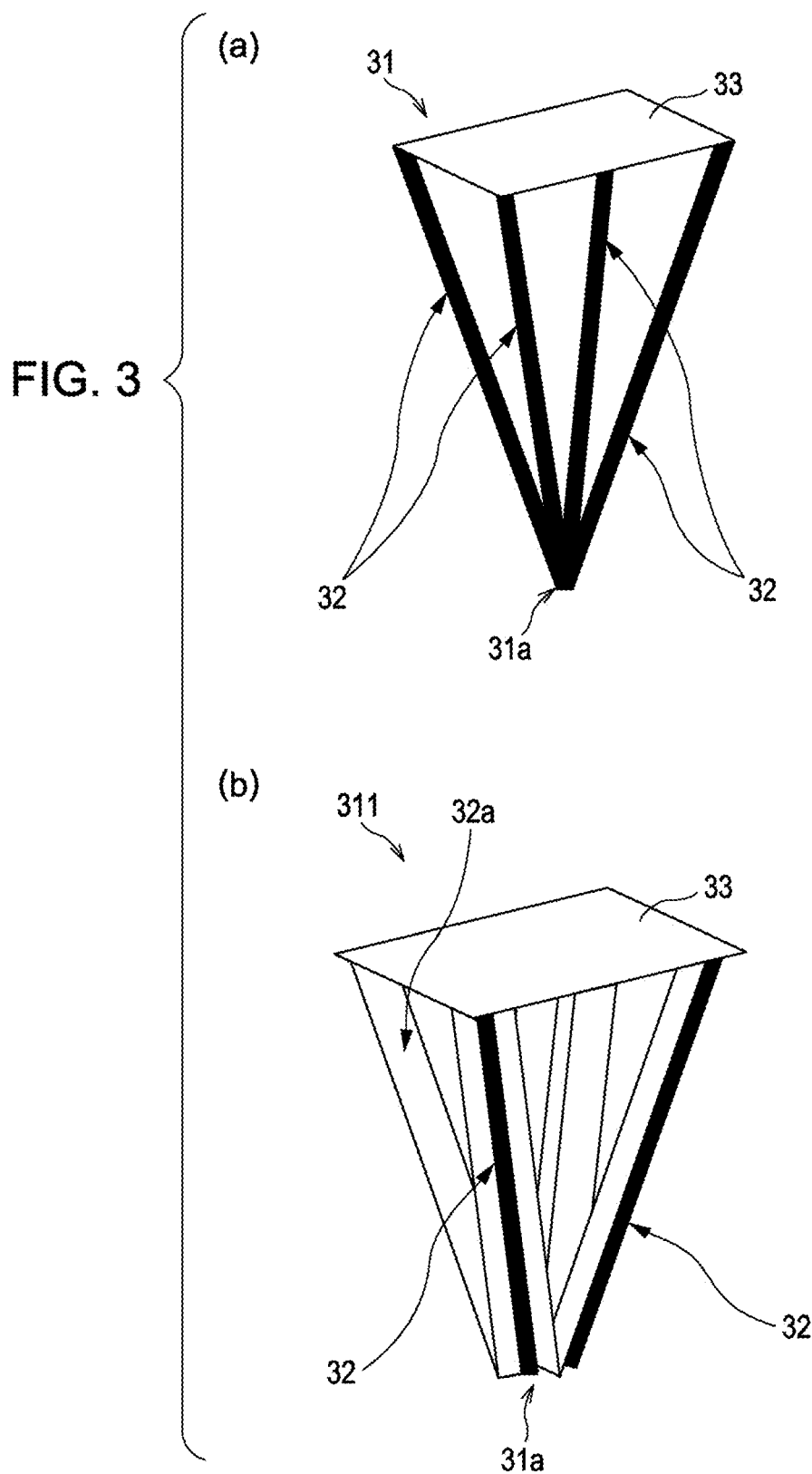
FIGS. 3A and 3B are perspective views schematically showing heating means shown in FIG. 2.
Figure 4:
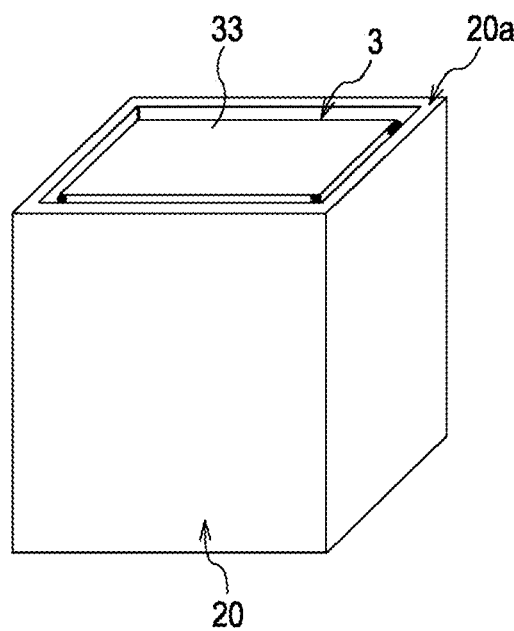
FIG. 4 is a perspective view schematically showing the state when the heating means shown in FIGS. 3A and 3B is arranged in a mold.

A release layer forming apparatus 100 according to an embodiment of the present invention is described with reference to FIGS. 2 to 4. FIG. 2 is a schematic view showing a configuration of the release layer forming apparatus 100. FIGS. 3A and 3B are perspective views schematically showing heating means shown in FIG. 2. FIG. 4 is a perspective view showing the state when the heating means shown in FIGS. 3A and 3B has descended into a mold base.

The release layer forming apparatus 100 shown in FIG. 2 is an apparatus for forming the release layer 2 on the surface of the mold base 20. Specifically, with the release layer forming apparatus 100, a slurry S is applied to the inner surface of the mold base 20 by spraying and a release layer 2 is then formed through drying process.

As shown in FIG. 2, the release layer forming apparatus 100 includes a booth 11 that is a casing and a turntable 12 and a transfer table 13 both disposed in the booth 11.

The booth 11 includes a first treatment space 11a used in spray application process and a second treatment space 11b used in drying process.

The turntable 12 is a table on which a mold 1 (mold base 20) is placed during the spray application process and the drying process. In this embodiment, the turntable 12 is disposed rotatably in a horizontal direction as indicated by arrow AR1. That is, the turntable 12 can rotate in a horizontal direction during the spray application process and the drying process. The turntable 12 may be fixed. Furthermore, the turntable 12 may be not necessarily disposed in the second treatment space 11b.

The transfer table 13 is used for horizontally transferring the turntable 12, on which the mold 1 (mold base 20) is placed, between the first treatment space 11a and the second treatment space 11b in the direction indicated by arrow AR2.

The turntable 12 and the transfer table 13 are driven through a driving mechanism (not shown).

The first treatment space 11a and the second treatment space 11b are separated by a partition wall 14 having a door 14a. This does not easily allow the atmosphere of the spray application process in the first treatment space 11a to flow into the second treatment space 11b. By opening the door 14a disposed in the partition wall 14, the turntable 12 can be transferred between the first treatment space 11a and the second treatment space 11b using the transfer table 13.

The release layer forming apparatus 100 includes a water curtain 15 that is a splash handling mechanism and exhaust means 16.

The exhaust means 16 is disposed in the upper portion of the first treatment space 11a and exhausts the atmosphere inside the booth 11.

The water curtain 15 is used for collecting the slurry that scatters to the surroundings and reducing the contamination in the booth 11 caused by the slurry. The water curtain 15 is water ejected from many ejection ports (not shown) in the vertically downward direction. The ejection ports are disposed in the upper portion of the first treatment space 11a and near the partition wall 14. The water curtain 15 is located to the front in the spraying direction of the nozzle 25 described below.

As shown in FIG. 2, in this embodiment, spraying is performed in the direction toward the second treatment space 11b. Therefore, the water curtain 15 is located on the second treatment space 11b side of the first treatment space 11a, but the location is not limited thereto. For example, spraying from the nozzle 25 may be performed in the direction toward another wall that forms the booth 11. In this case, the water curtain 15 is located to the front in such a spraying direction.

Instead of the water curtain 15, an air exhauster that exhausts the atmosphere of the first treatment space 11a through a filter may be disposed to collect the slurry that scatters. Furthermore, if a splash handling mechanism is provided, the partition wall 14 may not be necessarily disposed.

The release layer forming apparatus 100 may further include a release agent collecting plate disposed to the front in the spraying direction of the nozzle 25 and a release agent collecting container disposed below the release agent collecting plate. The release agent collecting plate and the release agent collecting container may be disposed between the water curtain 15 and the nozzle 25. The slurry that has scattered to outside the mold base 20 collides with the release agent collecting plate. The solidified release agent falls down onto the lower portion of the release agent collecting plate and is collected in the release agent collecting container. The thus-collected release agent has a small amount of solvent component and is composed of a binder and a ceramic powder such as silicon nitride with a high purity. Therefore, the thus-collected release agent can be reused by forming slurry again. The release agent collecting plate and the release agent collecting container may be composed of a material such as stainless steel or a fluorocarbon resin. The roughness of the surfaces of the release agent collecting plate and the release agent collecting container is desirably small.

Spray application means 21 is disposed in the first treatment space 11a. The spray application means 21 is connected to a tank 22 disposed outside the booth 11 through a first supply path L1 that is a circulating supply path. The spray application means 21 ejects the slurry S stored in the tank 22 toward the mold base 20 through the nozzle (spray gun) 25.

The slurry S is pumped out using a pump 23 such as a diaphragm pump provided on the first supply path L1. The flow rate of the slurry S is adjusted with a flow rate adjusting mechanism 24 provided on the first supply path L1.

The flow rate adjusting mechanism 24 may have a mechanism with which the application amount is adjusted while the flow rate of slurry applied is monitored using a flowmeter.

The nozzle 25 is disposed in the first treatment space 11a at the end of a second supply path L2 that diverges from the first supply path L1. The slurry S is ejected from the nozzle 25 at an ejection pressure according to the result of flow rate adjustment obtained through the flow rate adjusting mechanism 24.

The nozzle 25 is disposed so as to be movably, for example, as indicated by arrow AR3. Thus, the slurry S can be efficiently attached to any region of the mold base 20 placed on the turntable 12. By combining the movement of the nozzle 25 with the rotation of the turntable 12, the slurry S can be ejected over a wide area of the inner surface of the mold base 20.

The nozzle 25 may have a mechanism with which the ejection of the slurry S is turned on and off and the ejection pressure is adjusted. The nozzle 25 may be movable to outside the booth 11.

The second supply path L2 and the nozzle 25 may have a structure that allows the nozzle 25 to eject the slurry S into the tank 22 when the release layer 2 is not formed. In this structure, a slurry S can be ejected from the nozzle 25 at almost all times regardless of whether the release layer 2 is formed. By ejecting the slurry S from the nozzle 25 at all times in such a manner, the clogging of the slurry S in the first supply path L1, the second supply path L2, and the nozzle 25 and the variation in the viscosity of the slurry S are suppressed. When the slurry S is ejected into the tank 22 from the nozzle 25, the slurry S can be ejected to the surface of an inner wall of the tank 22. This can reduce the entry of air into the slurry S stored in the tank 22. The flow rate when the slurry S is ejected into the tank 22 can be decreased compared with the flow rate when the slurry S is ejected for forming the release layer 2.

The first supply path L1 may optionally have an adjustment mechanism that adjusts the viscosity of the slurry S. Specifically, an apparatus such as a viscosity controller may be disposed. Such an apparatus monitors the viscosity of the slurry S and reduces an increase in the viscosity by adding a solvent to the tank 22 when an increase in the viscosity is detected.

In FIG. 2, the tank 22 is disposed outside the booth 11, but may be disposed inside the booth 11.

The tank 22 includes stirring means 26 that stirs the slurry S through the rotational operation of a stirring rod 26a. By continuously or intermittently performing stirring using the stirring means 26 during the formation of the release layer 2, the variation in the viscosity of the slurry S stored in the tank 22 can be reduced. The tank 22 and the stirring rod 26a are each composed of a material that can be easily cleaned. Examples of the material include a material whose surface is coated with a fluorocarbon resin and stainless steel whose surface is buffed. This can reduce the entry of impurities into the slurry S. For the stirring means 26, means that can efficiently stir the slurry S in the tank 22 in accordance with the volume of the tank 22 and the amount of the slurry S left may be used. For example, the slurry S may be stirred by rotating a stirring bar inserted into the tank 22 using a magnetic stirrer disposed outside the tank 22.

Heating means 31 is disposed in the second treatment space 11b. The heating means 31 is drying means that dries the slurry S applied to the inner surface of the mold base 20 to form the release layer 2.

As shown in FIG. 3A, the heating means 31 has a substantially quadrangular pyramid-shaped structure (inverted pyramid-shaped structure) whose apex 31a faces in a downward direction. The heating means 31 includes four heaters (heating members) 32 and a lid 33. The heaters 32 are disposed at the positions corresponding to the four oblique sides of the quadrangular pyramid. The lid 33 is provided at the uppermost position that corresponds to the bottom of the quadrangular pyramid. A support member (not shown) for supporting the lid 33 and the heaters 32 can be composed of a certain metal material or the like.

The heating means 31 heats the surroundings of the heaters 32 through the generation of heat achieved by turning on electricity from a heating power source 34 shown in FIG. 2. The heaters 32 may be disposed such that the surroundings of the heating means 31 are efficiently heated.

FIG. 3B is a perspective view of heating means 311 according to another embodiment. As shown in FIG. 3B, the heating means 311 includes a reflection member 32a disposed on the side of each of the heaters 32 to further increase the heating efficiency. The reflection member 32a reflects radiant heat that moves toward inside the heating means 311 from the heaters 32, in the direction toward outside the heating means 311. The reflection member 32a and the lid 33 can be formed in one piece using the same material as the lid 33.

Each of the heaters 32 may be photo-heating means such as a lamp heater that radiates light whose wavelength is in an infrared region. The heater 32 may be, for example, a near infrared lamp (near infrared heating means) that is excellent in temperature response.

In addition to the heating means including the heaters 32 and the reflection member 32a disposed on the side of each of the heaters 32, a lamp heater coated with a reflection film and having a directivity in a heating direction may be used as the heating means. In this case, the temperature increase of the support member or the like due to the photo-heating means can be reduced, and the temperature of the inner surface of the mold base 20 to which a release agent is applied can be increased. Thus, nearly uniform heating can be performed within a short time.

The heating means 31 is disposed so as to be movably in an up-down direction as indicated by arrow AR4 of FIG. 2. Heating is performed by the heating means 31 after the mold base 20 is placed at a position below the heating means 31 and the heating means 31 is descended into the inner space of the mold base 20. The heating means 31 is descended until the lid 33 comes down to substantially the same level as the uppermost portion 20a of the mold base 20. That is, heating is performed while the upper face of the mold base 20 is covered with the lid 33.

As shown in FIG. 4, the heating means 31 is located such that the four heaters 32 face the corresponding inner sides and the corresponding corners of the inner bottom of the mold base 20 (hereinafter also referred to as "inner ends"). To achieve such an arrangement, the heating means 31 has a shape and a size that do not allow the apex 31a to contact the bottom of the mold base 20 and that provide a gap 3 between the lid 33 and the mold base 20 when the lid 33 is descended to the above-described level.

As described above, since the slurry S applied to the inner surface of the mold base 20 is dried by heating while the heating means 31 is located inside the mold base 20, the slurry S that has been applied is nearly uniformly dried. This method does not easily cause the variation in heating compared with the method in which heating is performed from the outside of the mold base 20. As a result, a release layer 2 can have a thickness closer to a uniform thickness. Furthermore, the equipment cost is reduced and the mold base 20 can be easily transferred between apparatuses. This can reduce a decrease in the temperature of molds during the heating step of the mold base 20 to the application step.

In particular, when the slurry S is dried by heating, the four heaters 32 are arranged so as to face the inner ends of the mold base 20 as described above. Thus, the slurry S is sufficiently dried even at the portions where drying does not easily proceed. In addition, when the heating means 31 includes the reflection member 32a as shown in FIG. 3B, heat (radiant heat) from the heaters 32 can be provided to the above-described inner ends more efficiently.

By appropriately adjusting the output of each of the heaters, the inner surface of molds can be heated so as to have a predetermined optimum temperature distribution. For example, the inner ends of the mold base 20 where temperature easily decreases during the heating step to the application step can be heated to a temperature higher than that of the side faces or the bottom. Therefore, a release layer having less variation in thickness can be formed.

The release layer forming apparatus 100 may include a heat insulator and a jig used for fixing the mold base 20, the heat insulator and the jig being disposed at the periphery of the mold base 20. In such a release layer forming apparatus 100, the inner surface of the mold base 20 can be heated to a predetermined temperature within about several tens of seconds to several minutes.

Although not shown in FIGS. 3 and 4, the heating means 31 includes a gas nozzle (gas supplying means) 35 connected to the lid 33 as shown in FIG. 2. The gas nozzle 35 supplies gas provided from a gas cylinder 36 disposed outside the booth 11 toward a position below the lid 33.

By supplying the gas from the gas nozzle 35 during the heating process (drying process), heat circulation can be generated inside the mold base 20 to reduce the variation in the temperature distribution inside the mold base 20. Moreover, the heating volatilizes the solvent from the slurry S and thus the air inside the mold base 20 contains a volatile solvent component. For example, when the solvent is water, the air inside the mold base 20 contains a large amount of moisture. In this case, gas is supplied to the inside of the mold base 20 from the gas nozzle 35, and the air inside the mold base 20 is exhausted from the gap 3 between the mold base 20 and the heating means 31. This reduces the delay of drying and the variation in the thickness of a release layer which are caused when the volatile solvent component is left inside the mold base 20. Examples of the gas used include air and inert gas such as argon or nitrogen.

Figure 5:
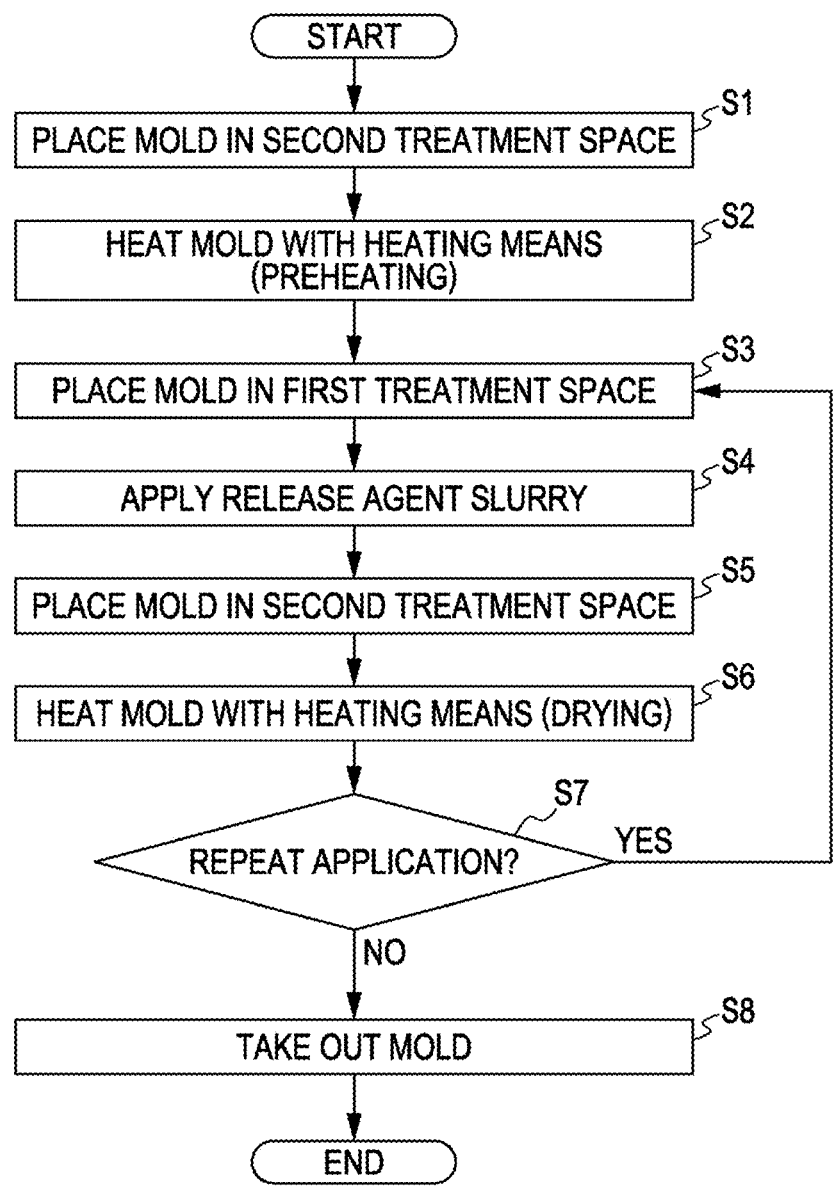
FIG. 5 is a flowchart showing a procedure of forming a release layer according to an embodiment of the present invention.

A method for forming the release layer 2 onto the mold base 20 using the release layer forming apparatus 100 is described with reference to FIG. 5.

First, the mold 1 on which the release layer 2 has not been formed, that is, the mold base 20 is placed on the turntable 12 and arranged at a predetermined position of heating process in the second treatment space 11b (Step S1). The heating means 31 is descended into the mold base 20. The inside of the mold base 20 is then heated by allowing the heaters 32 to generate heat by sending an electric current to the heaters 32 from the heating power source 34 (Step S2).

Such heating instantly volatilizes a solvent component when slurry is applied in the subsequent step to reduce runs of the slurry and decreases an undried area on the mold base 20 side of the release layer 2, that is, the inner side of the release layer 2. In other words, this heating corresponds to preheating that improves adhesiveness of the slurry to the inner surface of the mold base 20.

The heating temperature may be about 80 to 300° C., specifically 160 to 260° C. The heating temperature can be suitably determined in accordance with various conditions such as the material and size of the mold base 20 and the type of slurry to be applied. The term "heating temperature" is a temperature of the inner surface of the mold base 20 to which slurry is applied.

After the preheating, the mold base 20 together with the turntable 12 is transferred using the transfer table 13 to a predetermined position of application process in the first treatment space 11a (Step S3). With the spray application means 21, the slurry S is applied to the inner surface of the mold base 20 from the tip of the nozzle 25 (Step S4). The slurry S is applied while the nozzle 25 is moved appropriately or in the predetermined order, until the slurry S having a predetermined thickness is formed on the inner surface. The turntable 12 may be optionally rotated.

After the application of the slurry S is completed, the mold base 20 together with the turntable 12 is transferred using the transfer table 13 to the position of heating process in the second treatment space 11b again (Step S5). The heating means 31 is descended into the mold base 20 to which slurry has been applied. The inside of the mold base 20 is then heated by allowing the heaters 32 to generate heat by sending an electric current to the heaters 32 from the heating power source 34 (Step S6). With the heating, the slurry S that has been applied to the inner surface of the mold base 20 is dried.

The heating temperature may be about 80 to 300° C. and can be suitably determined in accordance with various conditions such as the material and size of the mold base 20 and the type of the slurry S to be applied. The heating means 31 can bring heat-drying to the inside of the mold base 20 closer to uniform heat-drying.

When a near infrared lamp is used as the heater 32, the slurry S can be heated to a predetermined temperature range quickly after the initiation of heating. Thus, undried slurry S does not easily run down and the time required for drying process can be shortened.

The timing when the drying process is ended may be determined on the basis of any criterion that achieves proper dried state. However, when an additional layer of slurry S is applied as described below, the drying conditions (end conditions) may be determined so as to reduce the occurrence of delamination caused by the fact that the slurry S newly applied is not fixed onto the release layer 2 that has been formed in advance. That is, the slurry S is recommended not to be dried excessively to the point where no more undried portion is left.

When the slurry S is applied again (an additional layer of slurry S is applied) after the completion of drying process (YES in Step S7), the process is returned to Step S3 and spray application is performed while the mold base 20 is being heated without decreasing the temperature of the mold base 20 to room temperature. That is, spray application is performed while the inner surface of the mold base 20 is maintained at a high temperature. This reduces runs of a release agent slurry. Even if a large amount of slurry is applied at a time, an undried area on the mold base 20 side of the release layer 2 is reduced. In other words, a decrease in adhesion between the release layer 2 and the mold base 20 or between the release layers 2, detachment of the release layer 2, or occurrence of lift or the like can be reduced. As a result, the number of applications repeatedly performed is decreased.

When the slurry S is not applied again after the completion of drying process (NO in Step S7), the mold base 20 is taken out from the booth 11 (Step S8). The formation process of the release layer 2 onto the mold base 20 is completed, and thus the mold 1 is obtained.

By performing the application process and the drying process multiple times (e.g., about ten times) to provide multiple release layers, an undried area, which is not easily dried, on the mold base 20 side of the release layer 2 is reduced and the uniformity of the thickness of the release layer 2 is improved, which can reduce the detachment of the release layer.

As described above, in this embodiment, when the release layer is formed on the inner surface of the mold base 20, the slurry that has been applied by spraying is dried using heating means disposed inside the mold base 20. This can improve the uniformity of dried state. In particular, the heating means has an inverted pyramid-shaped structure and includes four heaters at positions corresponding to four oblique sides. Thus, the slurry can be sufficiently dried even at the inner ends of the mold where drying does not easily proceed. Furthermore, by performing the application process and the drying process multiple times to provide multiple release layers, the uniformity of the thickness of the formed release layer can be further improved.

Heating means according to another embodiment of the present invention are described with reference to FIGS. 6A to 6C. As described below, various arrangements of heaters can be employed in the heating means. Thus, the inner surface of the mold base 20 can have a predetermined temperature distribution through heating.

Figure 6:
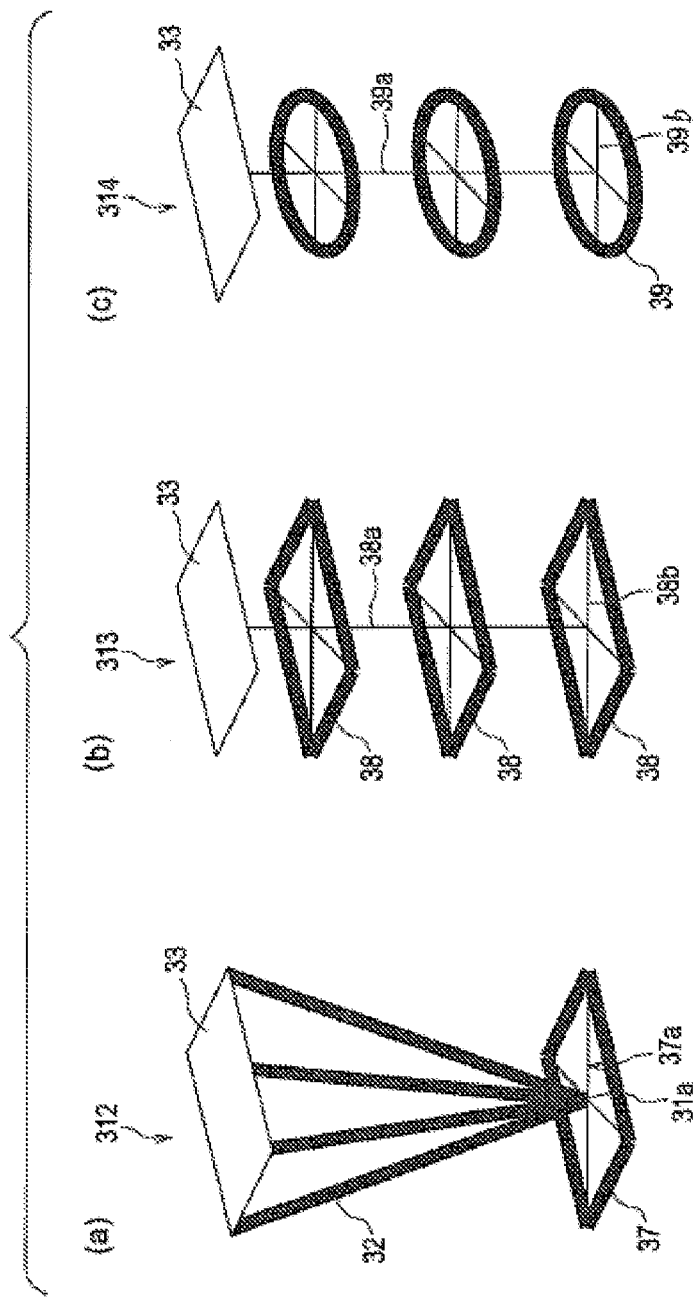
FIG. 6A is a perspective view schematically showing heating means according to an embodiment of the present invention.
FIG. 6B is a perspective view schematically showing heating means according to an embodiment of the present invention.
FIG. 6C is a perspective view schematically showing heating means according to an embodiment of the present invention.

FIG. 6A is a perspective view of heating means 312 according to an embodiment. The heating means 312 includes a lid 33, four heaters 32, and four heaters 37. The four heaters 32 are arranged at positions corresponding to oblique sides of a quadrangular pyramid, and the heaters 37 are arranged on the four sides of a rectangle. Herein, an apex 31a of the quadrangular pyramid is the center of gravity of the rectangle. The heaters 37 are supported by a support member 37a disposed between the apex 31a and the heaters 37. Furthermore, in FIG. 6A, the four heaters 32 are arranged at positions corresponding to oblique sides of the quadrangular pyramid, but each of the heaters 32 may be disposed between one of the vertexes of the lid 33 and one of the vertexes of the rectangle constituted by the four heaters 37. In other words, the heating means may have a trapezoidal shape when laterally viewed.

FIG. 6B is a perspective view of heating means 313 according to an embodiment. The heating means 313 includes a lid 33 and three heaters 38. The heaters 38 are arranged at a lowermost level of a support member 38a that extends from the lid 33 in a downward direction and at intermediate levels of the support member 38a. The heaters 38 have a rectangular shape like the heaters 37 shown in FIG. 6A. In this case, the heaters 38 are supported by the support member 38a and a support member 38b.

FIG. 6C is a perspective view of heating means 314 according to an embodiment. The heating means 314 includes a lid 33 and three heaters 39. The heaters 39 are arranged at a lowermost level of a support member 39a that extends from the lid 33 in a downward direction and at intermediate levels of the support member 39a. The heaters 39 each have a ring shape whose center is a position where the support member 39a passes through. In this case, the heaters 39 are supported by the support member 39a and a support member 39b. The heating means 314 shown in FIG. 6C can be used particularly when the inside of the mold base 20 has a cylindrical shape.

The number of heaters provided with the heating means is not limited to four corresponding to four sides of the mold base 20. For example, eight heaters in total may be disposed by arranging heaters corresponding to the centers of the side faces and the sides of the mold base 20. In view of the size, depth, and the like of the inner surface of the mold base 20 used, the number and arrangement of the heaters in the heating means 31 can be suitably determined.

A release layer forming apparatus 200 according to an embodiment of the present invention is described with reference to FIG. 7.

Figure 7:
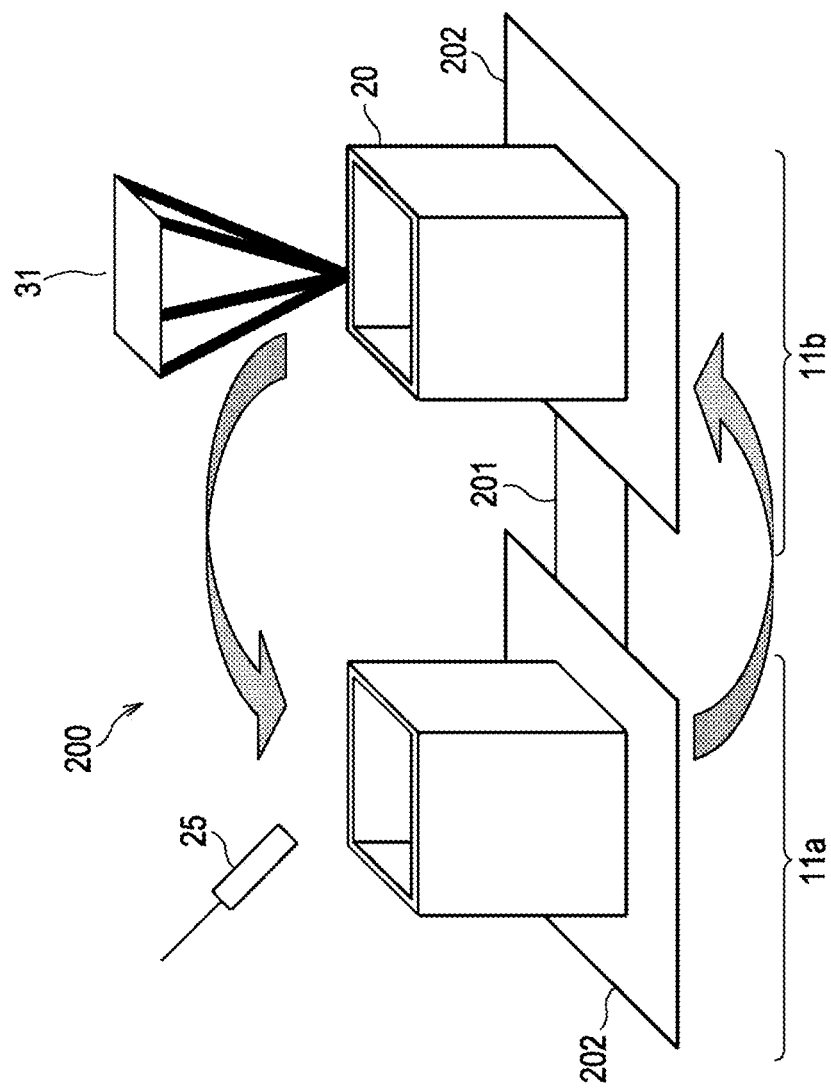
FIG. 7 is a perspective view schematically showing principal parts of a release layer forming apparatus according to an embodiment of the present invention.

The release layer forming apparatus 200 shown in FIG. 7 includes a rotational mechanism 201. The rotational mechanism 201 transfers the mold base 20 between the first treatment space 11a and the second treatment space 11b. The rotational mechanism 201 includes a plurality of mold placement tables 202 at positions symmetrical about the rotation center thereof. In FIG. 7, the rotational mechanism 201 includes two mold placement tables 202. In the release layer forming apparatus 200 including such a rotational mechanism 201, the application process in the first treatment space 11a and the drying process in the second treatment space 11b are performed on each of mold bases 20 at the same time. After the completion of each of such processes, the rotational mechanism 201 is rotated by an angle according to the number of mold placement tables 202, and the subsequent mold bases 20 can be processed in the first treatment space 11a and the second treatment space 11b. Thus, the throughput of the release layer formation is improved.

A release layer forming apparatus 300 according to an embodiment of the present invention is described with reference to FIG. 8.

Figure 8:
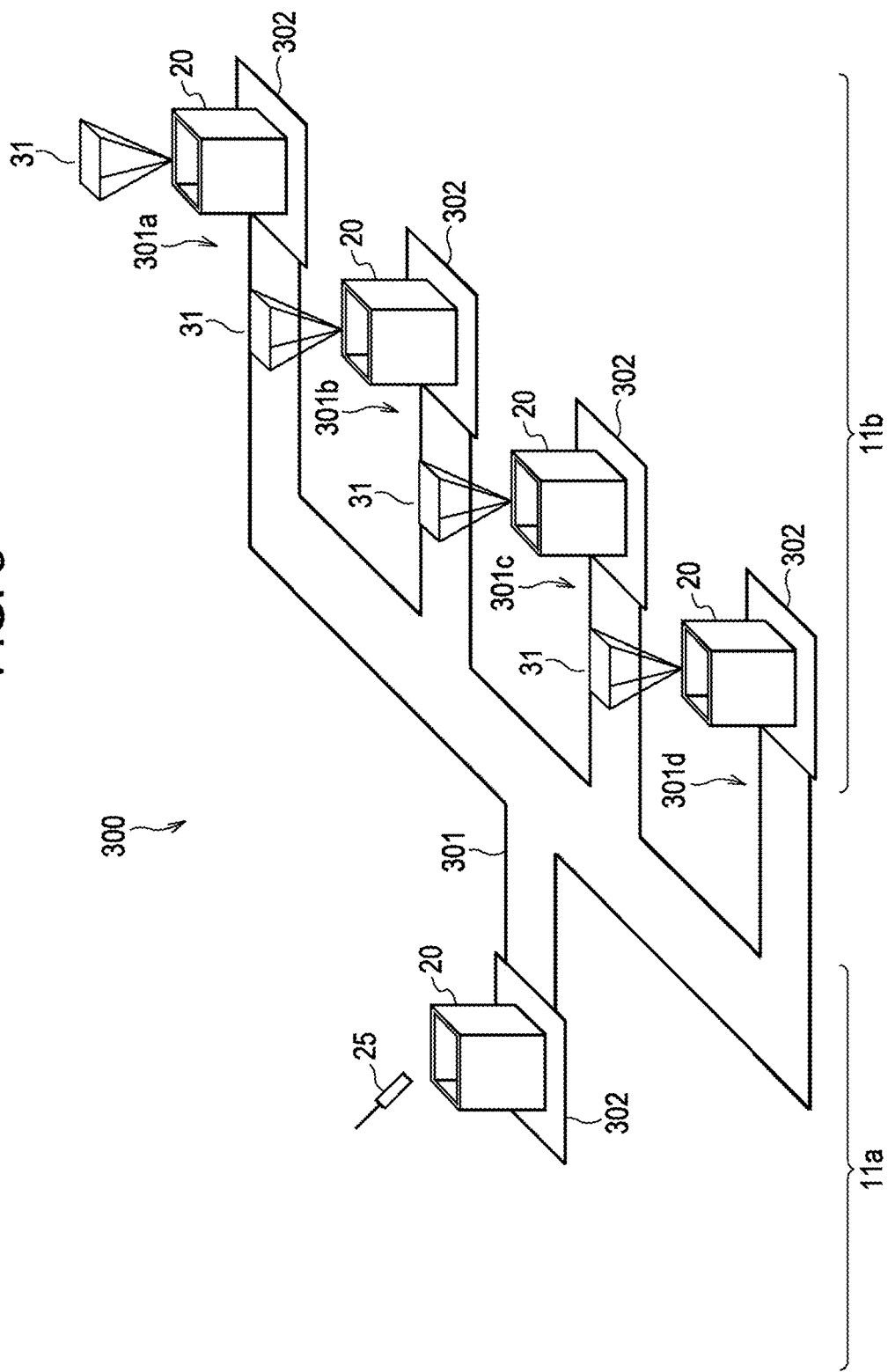
FIG. 8 is a perspective view schematically showing principal parts of a release layer forming apparatus according to an embodiment of the present invention.

The release layer forming apparatus 300 shown in FIG. 8 includes a transfer path 301 and a plurality of heating positions 301a to 301d in the second treatment space 11b. The transfer path 301 diverges into a plurality of paths, and heating positions 301a to 301d are located at the ends of the paths. The heating positions 301a to 301d each include heating means 31.

In the release layer forming apparatus 300 including such a transfer path 301, the mold base 20 subjected to the application process in the first treatment space 11a is transferred to one of the heating positions 301a to 301d together with the mold placement table 302. In turn, another mold base 20 together with the mold placement table 302 is transferred to the first treatment space 11a from the other one of the heating positions and subjected to the application process. Thus, the throughput of the release layer formation is improved.

The first treatment space 11a used for spray application process and the second treatment space 11b used for drying process may be disposed as independent casings and connected to each other through a transfer system.

The application means 21 and the heating means 31 may be disposed in a single casing. In this case, the mold base 20 is fixed in the casing without being transferred. A release layer can be formed by alternately performing the application process using the application means 21 and the heating process using the heating means 31. Furthermore, photo-heating means can be used as the heating means 31. In this case, there is no need to install a large-scale apparatus and the equipment cost can be reduced. Moreover, the application means 21 and the heating means 31 may be disposed in the release layer forming apparatus such that the application means 21 and the heating means 31 can process each of mold bases 20 at the same time.

A method for manufacturing a silicon ingot according to an embodiment of the present invention is described. In this embodiment, a silicon ingot is manufactured using the thus-formed mold 1.

The mold 1 is placed in an argon (Ar) atmosphere at a reduced pressure of 9 to 12 kPa. The mold 1 is heated to a temperature equal to or slightly lower than the melting point of silicon, for example, a temperature lower than the melting point by about several tens of degrees centigrade. When the mold 1 reaches such a temperature, a silicon melt prepared in advance is poured into the mold 1. Alternatively, the mold 1 may be charged with a silicon material and the silicon material may be heated and melted in the mold 1. The silicon melt is of p-type doped obtained by doping silicon with a dopant such as boron.

After that, the temperature of the mold 1 is gradually decreased from its bottom to subject the silicon melt to unidirectional solidification from the bottom of the mold 1. When the silicon melt is solidified completely, a silicon ingot is obtained.

In this embodiment, the mold 1 having the release layer 2 formed in the above-described steps is used. Thus, use of the mold 1 reduces that a portion of the release layer 2 is detached during the manufacturing of a silicon ingot and the detached portion enters a silicon melt as impurities, and the silicon melt comes into contact with and fuses with the mold 1.

A method for manufacturing a substrate for solar cell elements according to an embodiment of the present invention is described. The substrate for solar cell elements according to an embodiment is obtained by cutting the thus-obtained silicon ingot into parts having a predetermined size, for example, cutting it into nine parts, and then slicing the parts using a multi-wire saw or the like.

According to this embodiment, the substrate for solar cell elements is obtained from the silicon ingot manufactured using the mold 1. That is, the contact between the silicon melt and the mold and the entry of impurities into the silicon melt during the manufacturing of a silicon ingot can be reduced. Thus, a substrate for solar cell elements that can produce a solar cell element in which the degradation of characteristics caused by the above-described problems is reduced can be obtained at a high yield.

A solar cell element 110 and a method for manufacturing the solar cell element 110 according to an embodiment of the present invention are described. As shown in FIG. 9, the solar cell element 110 includes a substrate 101, a diffusion layer 102, a back surface electrode 108, a front surface electrode 106, and an anti-reflection film 107.

The substrate 101 is a polycrystalline silicon substrate obtained by slicing the silicon ingot manufactured using the mold 1 described above.

The diffusion layer 102 is a layer of n-conductivity type formed on the entire surface of the substrate 101. The diffusion layer 102 can be formed by diffusing an n-type impurity from the surface of the substrate 101 to a certain depth. In FIG. 9, the diffusion layer 102 is formed on the upper principal surface of the substrate 101.

The back surface electrode 108 includes a collecting electrode 104 and an output electrode 105. The collecting electrode 104 and the output electrode 105 are each mainly composed of, for example, silver. The collecting electrode 104 may be mainly composed of aluminum.

The front surface electrode 106 is formed on the front surface side of the substrate 101 and mainly composed of, for example, silver.

The anti-reflection film 107 is composed of, for example, silicon oxide, silicon nitride, or titanium oxide and formed on the upper surface of the diffusion layer 102.

An example of a method for manufacturing the solar cell element 110 is described.

First, a silicon ingot manufactured through the above-described steps is sliced to prepare a substrate 101 for solar cell elements of p-conductivity type. The resultant substrate 101 is processed so that a surface (light-receiving surface) of the substrate 101 has unevenness. A diffusion layer 102 is then formed on the substrate 101 by diffusing an n-type impurity from the surface of the substrate 101 having unevenness to a certain depth. Thus, a p-n junction is formed between the substrate 101 and the diffusion layer 102. Additionally, an anti-reflection film 107 composed of silicon oxide, silicon nitride, titanium oxide, or the like is formed on the surface of the diffusion layer 102.

A collecting electrode 104 is formed by applying an electrode paste mainly composed of aluminum to the back surface of the substrate 101 and firing the electrode paste. After that, a front surface electrode 106 and an output electrode 105 are respectively formed by applying an electrode paste mainly composed of silver to the front surface side and the back surface side of the substrate 101 in certain patterns and firing the electrode paste. Thus, the solar cell element 110 is formed.

Furthermore, a back surface field (BSF) layer 103, which is a high concentration p-type diffusion layer, may be formed on the back surface side of the substrate 101. In the case where the collecting electrode 104 is formed of aluminum, the BSF layer 103 is formed through diffusion of aluminum into the substrate 101 in the step of forming the collecting electrode 104, that is, in the step of applying and firing an aluminum paste.

Alternatively, the solar cell element 110 may have a configuration in which an electrode is formed only on the back surface side of the solar cell element 110.

The solar cell element 110 according to this embodiment includes the substrate 101 obtained from a silicon ingot manufactured using the mold 1 by the method described above. Thus, there can be provided a solar cell element in which the degradation of characteristics caused by the contact between the silicon melt and the mold and the entry of impurities into the silicon melt during the manufacturing of a silicon ingot are reduced. Furthermore, by the method for manufacturing the solar cell element 110 according to this embodiment, a solar cell element having such good characteristics can be manufactured at a high yield.

The present invention is not limited to the above-described embodiments, and various changes and modifications can be made within the scope of the present invention.

For example, in the pellet formation step and the body formation step, a cooling mechanism may be disposed in the kneading mixer in order to reduce a temperature increase caused by volatilization of water.

In the above description, the silicon melt is p-type doped, but may be n-type doped.

Examples

A surface-oxidized silicon nitride powder having an average particle size of about 0.5 µm and obtained by subjecting a silicon nitride powder to surface oxidation treatment and a silicon dioxide powder having an average particle size of about 20 µm were prepared. These powders were mixed with each other using a planetary mixer to obtain a ceramic powder. A binder solution containing an aqueous PVA solution was added to the ceramic powder, and the mixture was kneaded to form a body. After the resultant body was continuously kneaded, a binder solution was added dropwise to the body to prepare a slurry. Herein, the percentage of particles having an average particle size of 100 µm or more and that were present in the slurry was controlled by adjusting the amount of the binder solution charged for forming the body to 41 to 51% by mass relative to the amount of ceramic powder. A release layer was formed using the thus-obtained slurry, whereby the density of the formed release layer could be changed.

For the slurries of Examples 1 to 8 and Comparative Examples 1 to 3, the percentage of particles having an average particle size of 100 µm or more was 3.7% by mass. For the slurry of Example 9, the percentage was 1.6% by mass. For the slurry of Example 10, the percentage was 2.5% by mass. For the slurry of Example 11, the percentage was 5.7% by mass. For the slurry of Example 12, the percentage was 9.2% by mass. The term "percentage of particles having an average particle size of 100 µm or more" means, when a slurry is screened using a screen having an opening of 100 µm, a percentage (by mass) of particles left on the screen.

Subsequently, a mold base having a bottom and four side faces was prepared. The slurry was applied to the inner surface of the mold base using a spray apparatus and then dried.

In Example 1 and Comparative Examples 1 and 2, the slurry was dried by arranging the mold base in a drying furnace with a furnace temperature of 180° C. to heat the mold base. In Examples 2 to 12 and Comparative Example 3, the slurry was dried by disposing heating means having the near infrared lamp shown in FIG. 3B such that the heating means faces the inner surface of the mold base to heat the mold base. In Examples 1 to 12, the slurry was applied after the mold base was preheated at a predetermined temperature. In Examples 1 to 12 and Comparative Examples 2 and 3, a release layer was formed by repeatedly performing the application process and the drying process ten times. In Comparative Example 1, a release layer was formed by performing a single cycle of the application process and the drying process.

Ten molds were manufactured under each of the conditions, and the formed release layers were checked through visual inspection to measure fraction defective. Furthermore, the amount of residual water in each of the release layers was measured using a moisture analyzer (ML-50) that utilize the heating and drying method, available from A&D Company, Limited. Herein, except for in Comparative Example 1, the amount of residual water in the release layer (fifth layer) obtained by repeatedly performing the application process and the drying process five times was measured.

Table 1 shows the results. In Table 1, the term "inner surface temperature" is a drying temperature of the mold base, which was obtained by measuring the temperature of the mold base immediately after the drying process. Specifically, the inner surface temperature was obtained by measuring the temperature around the center of the side face on the inner surface of the mold using a radiation thermometer. The density was measured by partially removing the formed release layer having a size that is equivalent to about 0.07 to 0.1 g and then by using Archimedes' method. The term "drying process time (minute per process)" means the time required for a single drying process after the application process because the drying process is supposed to be performed ten times except for in Comparative Example 1.

TABLE 1

| | Number of applications [times] | Preheating | Percentage of particles having an average particle size of 100 μm or more [% by mass] | Density [g/cm³] | Drying method |
|---|---|---|---|---|---|
| Example 1 | 10 | Yes | 3.7 | 1.39 | Drying furnace (180° C.) |
| Example 2 | 10 | Yes | 3.7 | 1.39 | Near infrared heating |
| Example 3 | 10 | Yes | 3.7 | 1.39 | Near infrared heating |
| Example 4 | 10 | Yes | 3.7 | 1.39 | Near infrared heating |
| Example 5 | 10 | Yes | 3.7 | 1.39 | Near infrared heating |
| Example 6 | 10 | Yes | 3.7 | 1.39 | Near infrared heating |
| Example 7 | 10 | Yes | 3.7 | 1.39 | Near infrared heating |
| Example 8 | 10 | Yes | 3.7 | 1.39 | Near infrared heating |
| Example 9 | 10 | Yes | 1.6 | 1.41 | Near infrared heating |
| Example 10 | 10 | Yes | 2.5 | 1.40 | Near infrared heating |
| Example 11 | 10 | Yes | 5.7 | 1.37 | Near infrared heating |
| Example 12 | 10 | Yes | 9.2 | 1.32 | Near infrared heating |
| Comparative Example 1 | 1 | No | 3.7 | 1.39 | Drying furnace (180° C.) |
| Comparative Example 2 | 10 | No | 3.7 | 1.39 | Drying furnace (180° C.) |
| Comparative Example 3 | 10 | No | 3.7 | 1.39 | Near infrared heating |

| | Time [minute per process] | Inner surface temperature [° C.] | Amount of residual water (fifth layer) [%] | Fraction defective | Defective items |
|---|---|---|---|---|---|
| Example 1 | 8 | 160 | 4.5 | 3/10 | cracking/air bubble |
| Example 2 | 1 | 110 | 5.4 | 6/10 | cracking/peeling |
| Example 3 | 2 | 160 | 2.8 | 1/10 | scab |
| Example 4 | 2.5 | 175 | 1.8 | 0/10 | none |
| Example 5 | 3 | 190 | 1.5 | 0/10 | none |
| Example 6 | 4 | 210 | 1.2 | 1/10 | roughness |
| Example 7 | 6 | 260 | 0.9 | 2/10 | roughness |
| Example 8 | 8 | 300 | 0.5 | 4/10 | burning/roughness |
| Example 9 | 2.5 | 175 | 3.5 | 5/10 | air bubble |
| Example 10 | 2.5 | 175 | 2.2 | 1/10 | scab |
| Example 11 | 2.5 | 175 | 1.4 | 2/10 | cracking |
| Example 12 | 2.5 | 175 | 1.3 | 6/10 | cracking/roughness |
| Comparative Example 1 | 30 | 160 | 6.5 (first layer) | 10/10 | cracking/peeling |
| Comparative Example 2 | 8 | 160 | 4.9 | 9/10 | cracking/peeling |
| Comparative Example 3 | 4 | 210 | 2.1 | 7/10 | cracking |

It was confirmed from the results shown in Table 1 that the fraction defective could be reduced by applying a slurry after the mold base was preheated, whereby a release layer having a thickness closer to a uniform thickness could be formed. In particular, the fraction defective could be further reduced by performing the drying process such that the mold base was heated to an inner surface temperature of 160 to 260° C.

The invention claimed is:

1. A method for forming a mold comprising:
   forming a mixture by mixing ceramic particles comprising a silicon nitride powder and a first binder solution;
   kneading the mixture to form a plurality of pellets;
   kneading the pellets to form a body;
   forming a slurry by adding a second binder solution to the body; and
   forming a release layer by attaching the slurry to a surface of a mold base,
   wherein the mixture and the body are formed by using a planetary mixer whose blade undergoes planetary motion, and
   wherein a first revolution speed of the blade of the planetary mixer for forming the mixture is in the range of 5 to 20 revolutions per minute and a second revolution speed of the blade for forming the body is in the range of 25 to 40 revolutions per minute.

2. The method for forming a mold according to claim 1, wherein forming the mixture comprises mixing ceramic particles comprising a silicon nitride powder, a silicon dioxide powder and a first binder solution.

3. The method for forming a mold according to claim 2, wherein the mixture is obtained at least in part by mixing the silicon nitride powder with the silicon dioxide powder.

4. The method for forming a mold according to claim 1, wherein the forming the slurry comprises adjusting the viscosity of the slurry by adding the second binder solution or a solvent to the slurry.

5. The method for forming a mold according to claim 1, wherein the first binder solution is the same as the second binder solution.

6. The method for forming a mold according to claim 1, wherein, in the forming the body, the ceramic powder and the first binder solution are kneaded using a blade that undergoes planetary motion.

7. The method for forming a mold according to claim 6, wherein the blade is used also in the forming the slurry.

8. The method for forming a mold according to claim 1, wherein the forming the release layer comprises drying the slurry attached to the surface of the mold base by heating.

9. A method for forming a mold comprising:
forming a mixture by mixing ceramic particles comprising a silicon nitride powder and a first binder solution;
kneading the mixture to form a plurality of pellets;
kneading the pellets to form a body;
forming a slurry by adding a second binder solution to the body; and
forming a release layer by attaching the slurry to a surface of a mold base,
wherein the mixture, the plurality of pellets and the body are formed by using a planetary mixer whose blade undergoes planetary motion, and
wherein a first revolution speed of the blade of the planetary mixer for forming the mixture is in the range of 5 to 20 revolutions per minute and lower than a second revolution speed of the blade for forming the plurality of pellets and a third revolution speed of the blade of the planetary mixer for forming the body is in the range of 25 to 40 revolutions per minute and lower than the second revolution speed of the blade for forming the plurality of pellets.

10. The method for forming a mold according to claim 9, wherein forming the mixture comprises mixing ceramic particles comprising a silicon nitride powder, a silicon dioxide powder and a first binder solution.

* * * * *